(12) United States Patent
Sawa et al.

(10) Patent No.: US 6,571,152 B1
(45) Date of Patent: *May 27, 2003

(54) CREATION METHOD AND APPARATUS OF NETWORK CONFIGURATION FOR POWER SYSTEM

(75) Inventors: Toshiyuki Sawa, Hitachi (JP); Toshiyuki Furukawa, Hitachi (JP); Tsukasa Onishi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 179 days.

This patent is subject to a terminal disclaimer.

(21) Appl. No.: 09/712,197

(22) Filed: Nov. 15, 2000

Related U.S. Application Data

(63) Continuation of application No. 09/027,408, filed on Feb. 20, 1998, now Pat. No. 6,181,984.

(30) Foreign Application Priority Data

Feb. 24, 1997 (JP) ............................................. 9-038906

(51) Int. Cl.[7] .............................. H02J 3/14; H02J 3/12; G05B 13/02
(52) U.S. Cl. ........................................ 700/286; 700/295
(58) Field of Search .................................. 700/286–306, 700/900, 22, 101, 103, 173; 359/120; 329/318; 361/67; 725/79

(56) References Cited

U.S. PATENT DOCUMENTS

| | | | |
|---|---|---|---|
| 4,204,127 A | * 5/1980 | Carter, II | 307/39 |
| 4,589,075 A | 5/1986 | Buennagel | 700/286 |
| 4,747,041 A | * 5/1988 | Engel et al. | 364/200 |
| 5,222,192 A | 6/1993 | Shaefer | |
| 5,528,507 A | 6/1996 | McNamara et al. | 700/286 |
| 5,553,003 A | 9/1996 | Harada et al. | 700/286 |
| 5,706,207 A | * 1/1998 | Kurten et al. | 364/492 |
| 5,734,586 A | 3/1998 | Chiang et al. | 700/286 |
| 5,760,492 A | 6/1998 | Kanoi et al. | 307/18 |
| 5,770,895 A | * 6/1998 | Kumasaka | 307/32 |
| 5,798,939 A | 8/1998 | Ochoa et al. | 200/286 |
| 5,818,725 A | 10/1998 | McNamara et al. | 700/286 |
| 5,963,457 A | 10/1999 | Kanoi et al. | 700/291 |
| 6,018,690 A | * 1/2000 | Saito et al. | 700/295 |
| 6,259,972 B1 | * 7/2001 | Sumic et al. | 700/286 |

FOREIGN PATENT DOCUMENTS

WO    WO 96/30843    10/1996

OTHER PUBLICATIONS

"An Optimization Method for Distribution System Configuration based on Genetic Algorithm", Journal of Japanese Electrical Engineering Institute, vol. C116, No. 5, pp. 591–598, No Date.

* cited by examiner

Primary Examiner—Leo Picard
Assistant Examiner—Sean P. Shechtman
(74) Attorney, Agent, or Firm—Kenyon & Kenyon

(57) ABSTRACT

One of a plurality of switches constituting a power system is set as a perceived switch, and n optional switches Bk (k=1 to n) in the on state among the other switches are changed to the off state, and n loop networks including the perceived switch are created, and each switch Ck (k=1 to n) constituting the loop networks is changed from the off state to the on state so as to create a plurality of network configuration candidates, and a power network configuration is decided on the basis of the plurality of network configuration candidates.

6 Claims, 8 Drawing Sheets

CURRENT SYSTEM

ADJACENT STATUS

CURRENT SYSTEM

ADJACENT STATUS

CURRENT SYSTEM

ADJACENT STATUS

HALFWAY SYSTEM BY ONE CREATION AND OPENING OF LOOP

NEW ADJACENT STATUS

HALFWAY SYSTEM BY ONE CREATION AND OPENING OF LOOP

NEW ADJACENT STATUS

HALFWAY SYSTEM BY ONE CREATION AND OPENING OF LOOP

NEW ADJACENT STATUS

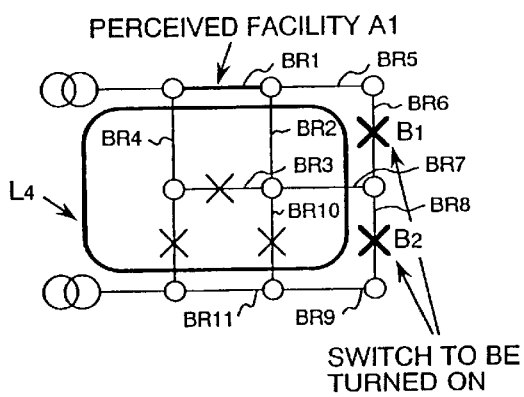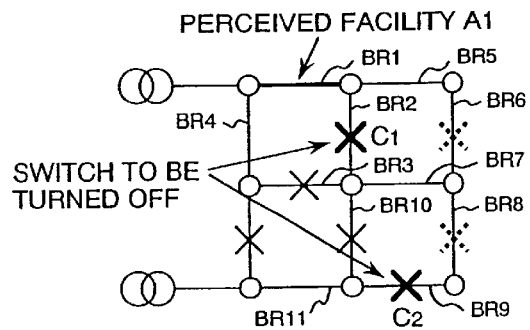
FIG. 7a
CURRENT SYSTEM
FIG. 7b
ADJACENT STATUS

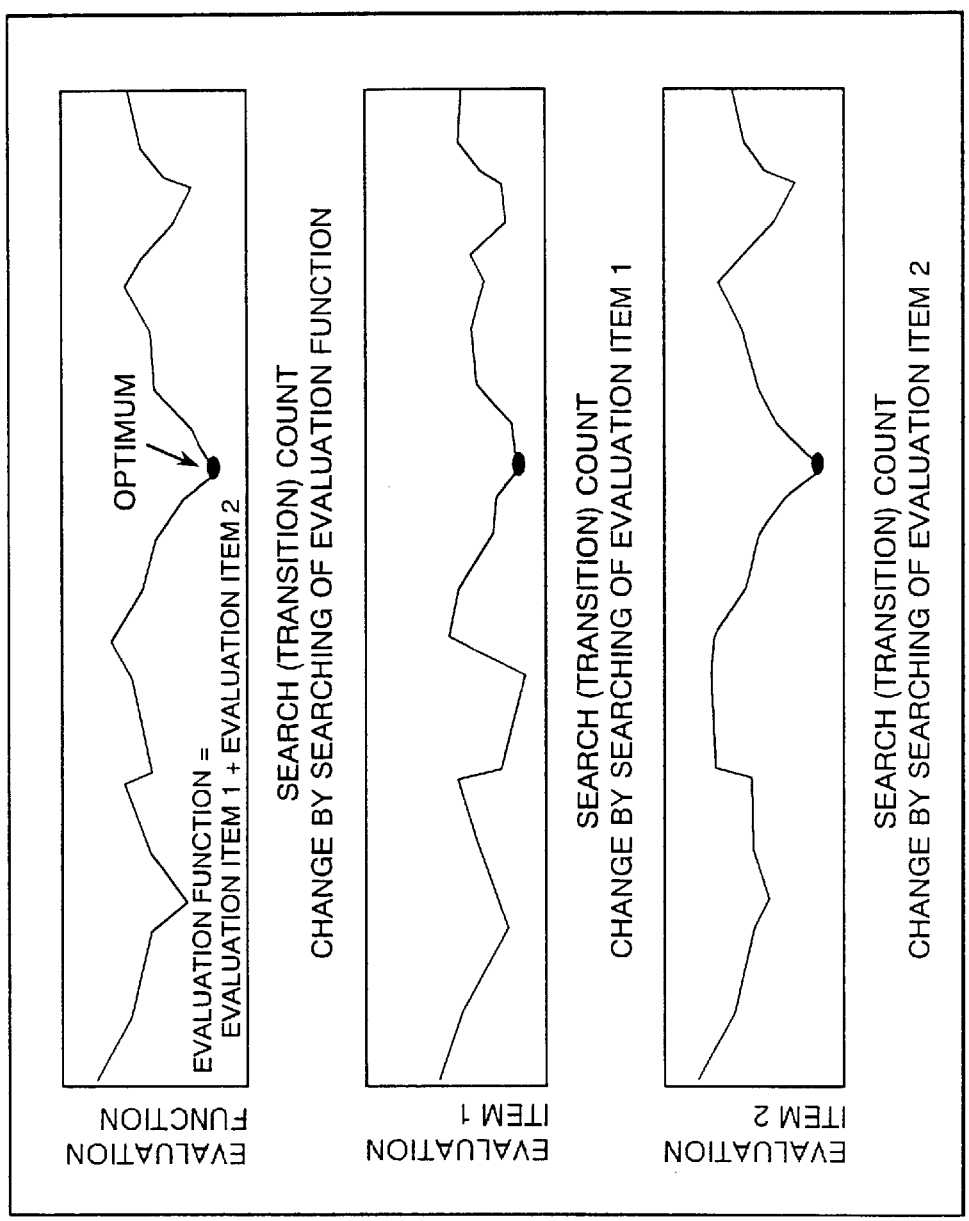

CREATION METHOD AND APPARATUS OF NETWORK CONFIGURATION FOR POWER SYSTEM

The present application is a Continuation of application Ser. No. 09/027,408, filed on Feb. 20, 1998, now U.S. Pat. No. 6,181,984.

FIELD OF THE INVENTION

The present invention relates to a creation method and apparatus of network configuration for power system and more particularly to an art for deciding the connection status of a power transmission and transformation facility system of a power system of power distribution or transmission.

BACKGROUND OF THE INVENTION

As a creation method of a power system configuration, it is proposed to decide a network configuration by a genetic algorithm in consideration of restrictions in the capacity of a feeder like "Optimization Method of Power Distribution System Configuration by Genetic Algorithm" (pp. 591 to 598) described in Journal of Institute of Electrical Engineers of Japan, Vol. C116, No. 5. According to the method, to maintain the radial network, the gene structure of the genetic algorithm is made appropriate and when a loop system or dividing system is set due to crossing-over or mutation, a countermeasure is taken individually.

SUMMARY OF THE INVENTION

The prior art does not use the operation knowledge (heruistic) on how the current network configuration is to be changed so as to improve the system, by performing a random search. As a result, when the problem scale is enlarged, it is difficult to find an operable solution (radial network) and it is more difficult to obtain an optimum solution.

If the range of neighbor status is narrowed when the space of a possible solution is divided into a plurality of spaces in a solution space, the solution space cannot be moved to another solution space unless going once via an neighbor status which is not a possible solution. On the other hand, when the range of neighbor status is widened, the search range is widened by one try. Therefore, candidates to be evaluated increase in number and the calculation time becomes longer.

A problem of the present invention is to provide a creation method and apparatus of a power network configuration which can obtain an optimum solution in a short time.

The present invention is realized on the assumption that the Tabu Search method is used as an optimization method. Recently, the Tabu Search method may be referred to the adaptive memory programming. The Tabu Search method is a method for defining a plurality of neighbor network configurations obtained by changing a part of the current network configuration (hereinafter, referred to as neighbor network configurations) and creating an optimum network configuration by repeating a transition such as moving to the neighbor network configuration in which the predetermined evaluation function becomes optimum among those neighbor network configurations and further moving sequentially to an optimum neighbor network configuration for the optimum neighbor network configuration.

However, when the local search method is applied, if the evaluation function of the system status at a certain point of iteration is worse than the evaluation function of either neighbor system status, no transition destination is found and the search ends immediately. Namely, the evaluation function cannot escape from the local minimum (minimum solution). When the evaluation function only transits to the most optimum neighbor network configuration, although it can exceed the local minimum once, it returns to the original local minimum again at the next search.

In the Tabu Search method, information (tabu tenure) changed with search is stored in a finite length taboo list, and movement toward the taboo stored in the taboo list is inhibited, and the evaluation function will not return to the local minimum. Namely, since movement toward the tabooed direction is inhibited for a given period, a wide solution space can be searched most widely and the local search can be speeded up. Since the Tabu Search method defines the neighbor network configuration appropriately using the heuristic method, it is possible to omit a useless search and obtain a better solution at a higher speed.

When although there is a better solution than the optimum solution obtained up to a certain point of iteration in the neighbor network configuration, there is a taboo for inhibiting movement to the solution in the taboo list, a mechanism (aspiration level) that movement is permitted though it is tabooed and the optimum solution in the neighborhood is searched can be introduced.

From the aforementioned viewpoint, the present invention is characterized in that one of a plurality of switches constituting a power system is set as a perceived switch, and n optional switches $Bk$ ($k=1$ to $n$) in the on state among the other switches are changed to the off state, and n loop networks including the perceived switch are created, and each switch $Ck$ ($k=1$ to $n$) constituting the loop networks is changed from the off state to the on state so as to create a plurality of network configuration candidates, and a power network configuration is decided on the basis of these plurality of network configuration candidates.

The power network configuration is decided by evaluating a plurality of network configuration candidates on the basis of the predetermined evaluation standard. The evaluation standard can use an evaluation function having at least one of the power transmission loss, the difference between the power flow restriction value and the power flow value, the ratio of the power flow restriction value to the power flow value, the number of facilities of power flow restriction violation, the difference between the voltage lower limit and the voltage, the ratio of the voltage lower limit to the voltage, and the number of facilities of voltage restriction violation as an item.

The present invention is based on that for example, each facility constituting a power system is expressed by a node and branch on the basis of the connection relationship, and an optional facility is perceived, and a switch for changing the power operation conditions (power transmission loss, restrictions of tidal current, restrictions of voltage, etc.) of the branch or node which is the perceived facility is aimed at, and by defining the network configuration obtained by turning the switch on or off under the condition of maintaining the radial network configuration as an neighbor network configuration, useless searches are reduced and the searching process is speeded up. Furthermore, by making the range of neighbor network configuration variable, an optimum power network configuration can be created even in a discontinuous solution space.

In other words, by turning the switch on so as to create a loop system including the perceived branch and turning another switch included in the created loop on so as to open the loop, the status amount (voltage, power flow, power transmission loss, etc.) of the perceived facility can be changed. At the same time, by using the heuristic method for always maintaining a radial power system, neighbor network configurations for changing the status amount of power operation conditions, that is, candidates of network configuration to be created can be created. By repeating transition to the optimum network configuration among the neighbor network configurations by the Tabu Search method, useless searches can be reduced much more. Furthermore, since the search area which is a possible solution can be searched widely, an optimum power network configuration can be created.

BRIEF DESCRIPTION OF THE DRAWINGS

FIG. 7 is a drawing for explaining an example of creating an neighbor late by changing the on and off status of two sets of switches.

FIG. 9 shows an example of an evaluation function and changes of evaluation items of a created optimum network configuration displayed on the display screen.

DETAILED DESCRIPTION OF THE PREFERRED EMBODIMENTS

The embodiments of the present invention will be explained hereunder with reference to FIGS. 1 to 8.

Figure 1:
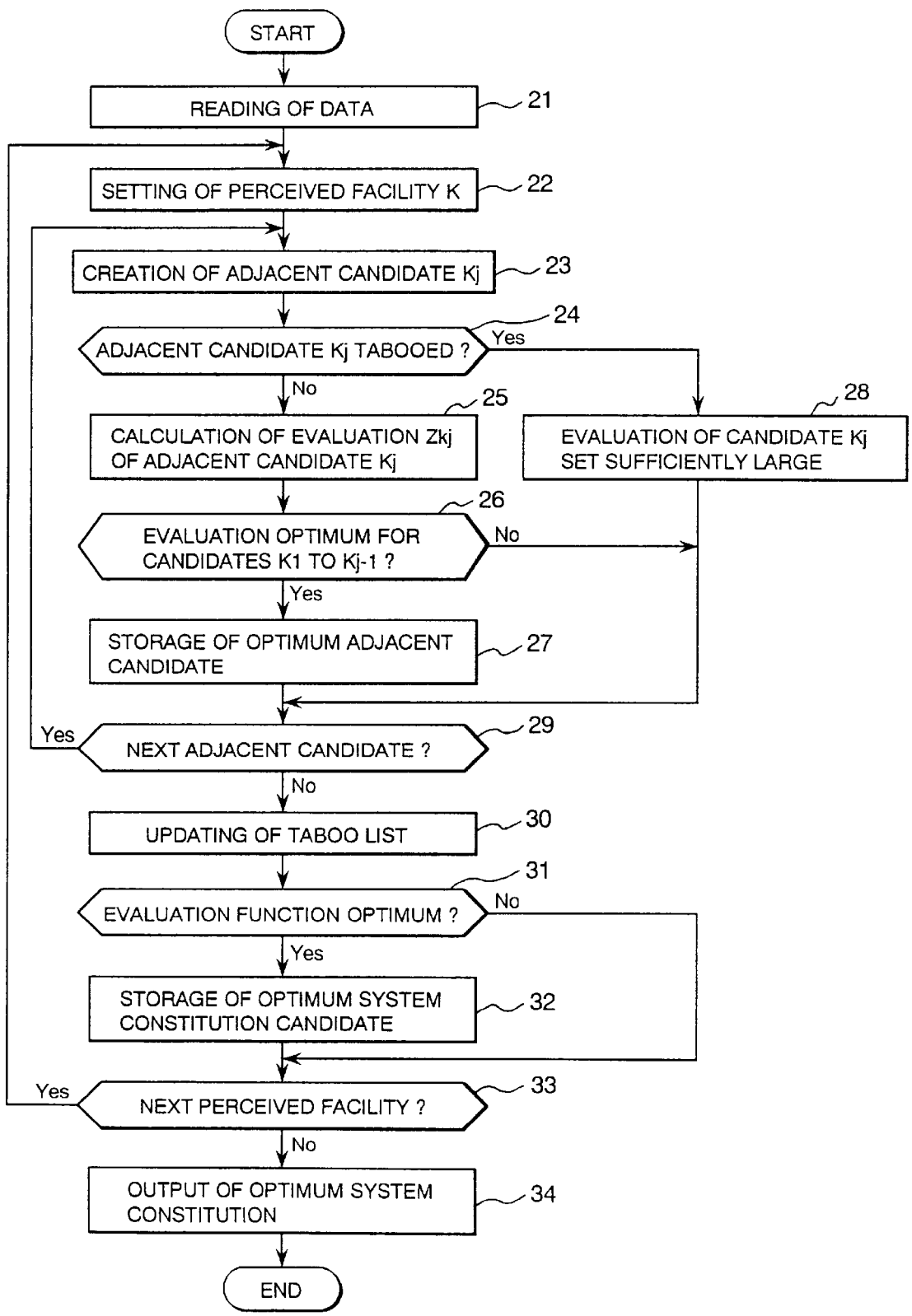
FIG. 1 is a flow chart showing an embodiment of the creation method of the optimum network configuration of the present invention.
Figure 2:
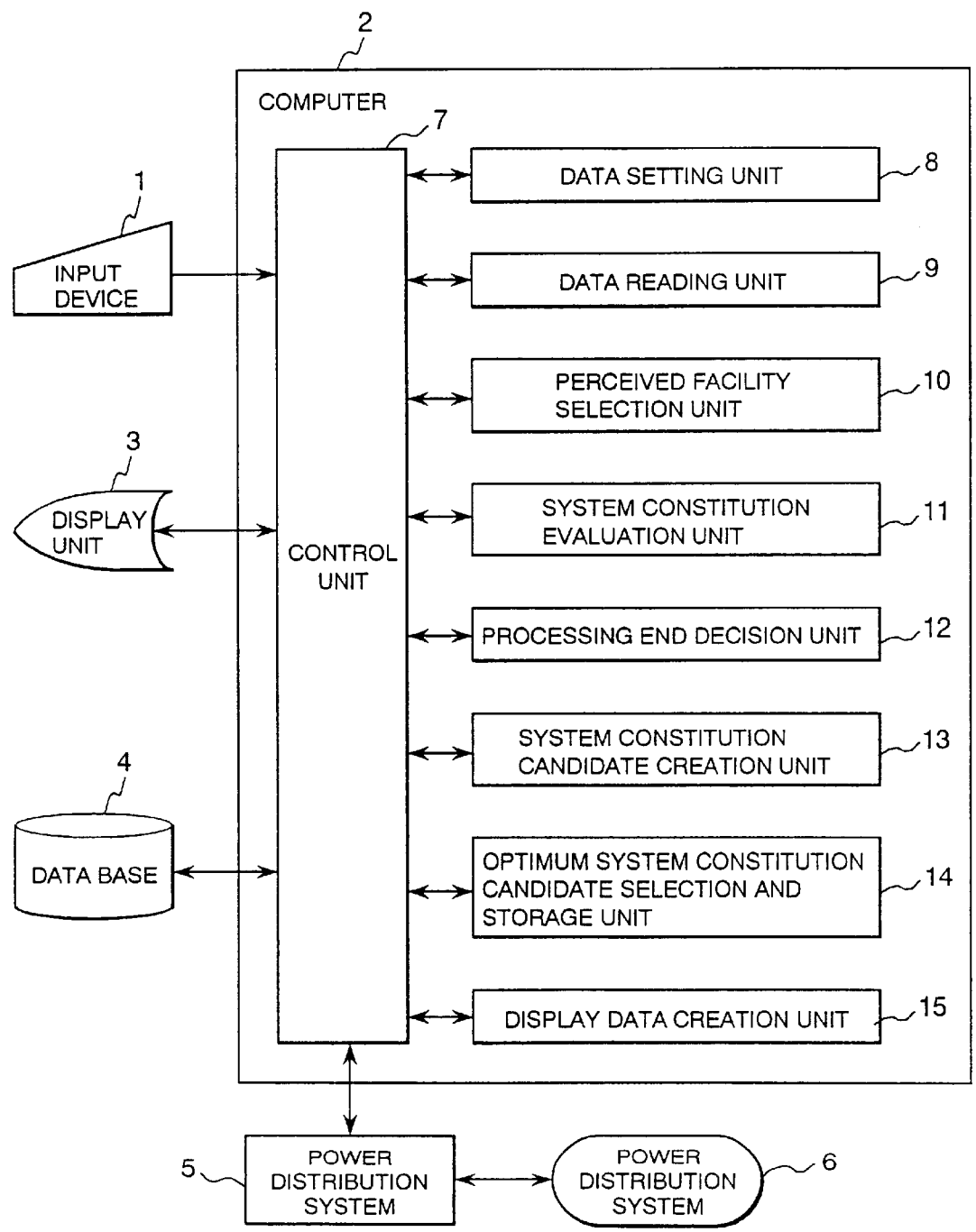
FIG. 2 is a whole block diagram of the network configuration creation apparatus of an embodiment to which the present invention is applied.

FIG. 1 is a flow chart showing an embodiment of the creation method of the power network configuration of the present invention and it is executed by the network configuration creation apparatus of an embodiment of the present invention shown in FIG. 2. As shown in FIG. 2, the network configuration creation apparatus comprises an input device 1, a computer 2, a display unit 3, and a data base 4. A power distribution system 6 is connected to the computer 2 via a power distribution system 5.

With respect to the input device 1, an input device such as a keyboard, mouse, or pointing device is properly used. The computer 2 comprises a control unit 7, a data setting unit 8, a data reading unit 9, a perceived switch selection unit 10, a network configuration evaluation unit 11, a processing end decision unit 12, a network configuration candidate creation unit 13, an optimum network configuration candidate selection and storage unit 14, and a display data creation unit 15. With respect to the display unit 3, a display unit such as a CRT or liquid crystal screen is applied. The data base 4 is a data storage unit such as a hard disk, magnetic tape, optical disk, or nonvolatile memory.

The power distribution system 5 comprises a plan of the power distribution system, a support system such as an operation system, a control system, and a data base of the whole power distribution system. The power distribution system 6 indicates an actual power transmission facility and the system status thereof and also outputs sensor information from the relay.

Next, the operation outline of each unit will be explained. The input device 1 sends selection information of the process for an item displayed on the display unit 3 and input data to the control unit 7 of the computer. The control unit 7 creates an optimum network configuration on the basis of data inputted or read from the input device 1, the data base 4, and the power distribution system 5, displays the result on the display unit 3, and also stores it in the data base 4. When a creation request of network configuration is presented to the computer 2 under the condition set by the system plan system and control system provided in the power distribution system 5, the computer 2 sends the network configuration created on the basis of the request and the evaluation result thereof to the power distribution system 5. The power distribution system 5 outputs a control signal to the power distribution system 6 on the basis of the network configuration and evaluation result created by the computer 2 and also reads the status information of system (the power flow, the ON-OFF status of the switch, etc.). The power distribution system 5 stores the read data and the data created by the internal system plan system in the internal data base. The control unit 7 of the computer 2 controls transmission and reception of data between the input device 1, the display unit 3, the data base 4, and the internal processing units 8 to 15 and allows the whole processes to operate normally.

Next, the outline of the functions of the processing units 7 to 15 of the computer 2 will be explained.

The control unit 7 processes data so as to transmit or receive data smoothly between the input device 1, the processing units from the data setting unit 8 to the display data creation unit 15, the data base 4, the power distribution system 5, and the display unit 3. The data setting unit 8 reads conditions of the data of the power distribution system to be used for creation of an optimum network configuration which is already stored, facility characteristics, and evaluation function from the data base 4 via the control unit 7. The data setting unit 8 changes the read conditions, creates new conditions, and also stores the created conditions in the data base 4 via the control unit 7. The data reading unit 9 reads the conditions to be used for creation of an optimum network configuration from the data base 4 via the data control unit 7, sets conditions to be used, and outputs them to the control unit 7. The perceived facility selection unit 10 selects one of the switches which are OFF at present among the network configurations created. The network configuration evaluation unit 11 inputs the load flow calculation conditions via the control unit 7, calculates the evaluation function, and outputs the result to the control unit 7. The process end decision unit 12 decides whether or not to terminate the repeat process on the basis of the termination conditions of the repeat process relating to creation of an optimum network configuration based on the information from the control unit 7 and outputs the decision result to the control unit 7. The network configuration candidate creation unit 13 decides a switch constituting a loop which can be created when the perceived switch is changed from OFF to ON on the basis of the information given from the control unit 7 and outputs the information to the control unit 7. The optimum network configuration candidate selection and storage unit 14 selects and stores a candidate having a best evaluation function among the neighbor network configuration candidates created by the network configuration candidate creation unit 13 (hereinafter properly abbreviated to neighbor candidates or network configuration candidates). The display data creation unit 15 creates data for displaying the network configuration having a best evaluation function among the network configurations of neighbor system candidates selected by the optimum network configuration candidate selection and storage unit 14 and the search progress on the display unit 3 and allows the display unit 3 to display them via the control unit 7.

Next, the overall basic function of the network configuration creation apparatus shown in FIG. 2 will be explained. The network configuration creation apparatus has a data setting and editing function and an optimum network configuration creation function and the data setting and editing function comprising a power distribution system data setting function, a system creation condition setting function, and an evaluation function setting function.

Figure 3:
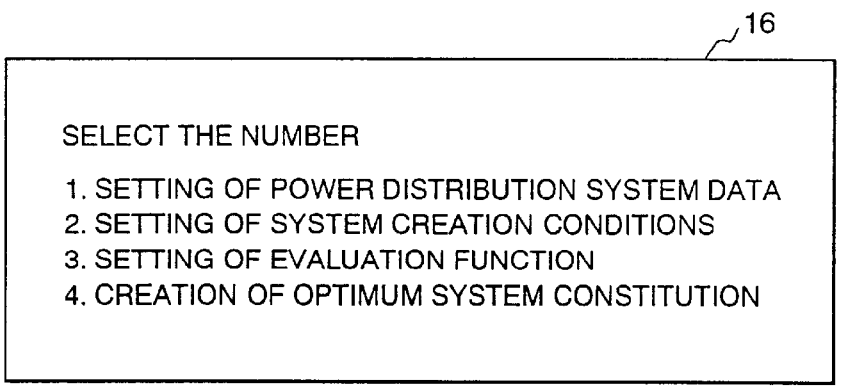
FIG. 3 is a drawing showing an example of an initial menu screen.

The computer 2 allows the display unit 3 to display the initial menu screen 16 shown in FIG. 3. As shown on the display menu screen 16, one menu of the 4 items comprising setting of power distribution system data (item 1), setting of system creation conditions (item 2), setting of an evaluation function (item 3), and creation of an optimum network configuration (item 4) can be selected. Therefore, when one of the items 1 to 3 is selected by touch input so as to set and edit data to be used for creation of a network configuration, the contents of the selected item can be set by the data setting unit 8.

When the menu item 1 is selected, the data setting unit 8 has a function for calling the created data of the power distribution system which is stored in the data base 4 by the registration number or calling the power distribution system data stored in the data base inside the power distribution system 5, performing necessary editing, creating new power distribution system data, assigning the registration number to it, and storing it in the data base 4. The power distribution system data is provided with a comment field accompanying the registration number so that it can be found under what condition the data corresponding to the registration number is set. The power distribution system data is data such as, with respect to the system facilities, the name and characteristics of sending transformation facility, the importance of facilities, connection information between facilities, ON-OFF information of the switch, and loads. The characteristics are the restricted value of power flow or target value of operation and the target voltage. With respect to the power distribution system facility, it can be considered that small scale power generating facilities such as a sodium-sulphur battery and solar cell will be introduced in the future, so that it is intended to set power generation (load-carrying capacity) or accumulation of electricity (load). When the setting of power distribution system data ends in this way, the screen returns to the initial menu screen 16.

Figure 4:
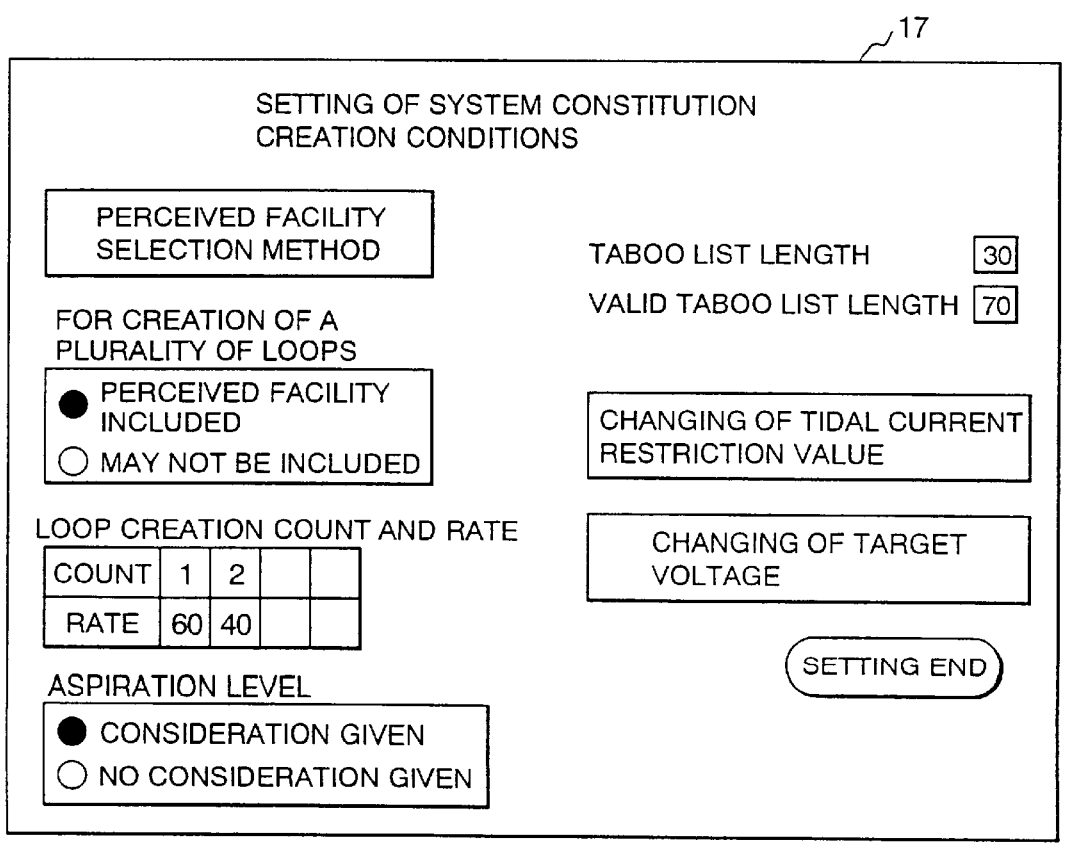
FIG. 4 is a drawing showing an example of a network configuration creation condition setting screen.

On the other hand, when the menu item 2 is selected, the data setting unit 8 displays the system creation condition setting screen 17 shown in FIG. 4 on the display unit 3 and processes according to the input setting of each displayed item. Firstly, the data setting unit 8 sets a selection method for deciding the order of perceived facilities. As such a method, there is a method, for example, for evaluating a power transmission loss maximum facility, a power transmission loss rate maximum facility, a voltage violation facility (the order among the violation facilities is set by other conditions such as the importance), a voltage violation maximum facility, a voltage violation rate maximum facility, a power flow restriction violation facility, a power flow restriction violation maximum facility, a power flow restriction violation rate maximum facility, an important facility order, and an open facility order (an important facility order of open facilities, etc.). The importance of facilities is decided by setting of power distribution data as mentioned above. When an evaluation relating to the perceived facility selection method is performed whenever the network configuration is changed, there is a possibility that the same facility is selected each time. Therefore, it is desirable to evaluate whenever the facilities are all processed once one by one or to create a taboo list of perceived facilities and exclude a fixed search count from the object of perceived facilities.

The operation for creating an neighbor network configuration candidate is a unit operation for changing the status of the perceived facility system. By repeating this unit operation sequentially, it is possible to change the status of perceived facility and transit it to the desired network configuration. The unit operation mentioned above is one of the following four operations.

(1) An operation for turning a facility (switch) on, then turning facilities (switches) other than the turned-on facility off, and turning the created loop on so as to newly create a loop including the perceived facility.

(2) An operation for opening, when the perceived facility is included in a loop, one of the other facilities constituting the loop and opening the loop (only loop cut).

(3) An operation only for turning a facility on so as to newly constituting a loop including the perceived facility (only loop in).

(4) An operation combining the operations (1) to (3).

In this case, when the power distribution system is an object, the initial system is a radial network and the desired system which is required to obtain is also a radial network, so that the aforementioned operation (1) and a unit operation combining the operation (1) are main. Even when an neighbor candidate is to be created by the unit operation (2), (3), or (4), it can be processed in the same way as the processing procedure of the unit operation (1) which will be described below or the processing procedure combining the unit operation (1).

An example of the unit operation will be explained by referring to FIGS. 5 to 7. FIG. 5 shows an example of neighbor candidate which can be created by turning a set of switches on or off by the unit operation (1), and FIG. 6 shows loop creation and opening of the unit operation (1) continuously done two times, that is, an example of neighbor candidate which can be created by turning the switch on or off twice, and FIG. 7 shows an example of neighbor candidate which can be created by turning simultaneously two sets of switches on or off. In these drawings, each transmission line is represented by a node and each switch is represented by a branch. However, they may be represented inversely instead of the aforementioned relationship and the status definition of an neighbor candidate can be considered in the same way as the method explained here independently of the representation method. The examples shown in the drawings are an example that a centralized load is connected to each transmission line (node). The mark x put on each branch indicates that the switch is off and each bold mark x indicates that the switch is operated. Each branch with no mark x indicates that the switch is on. Although not shown in the drawing, two transformers are assumed to be connected to the host system.

Figure 5A:
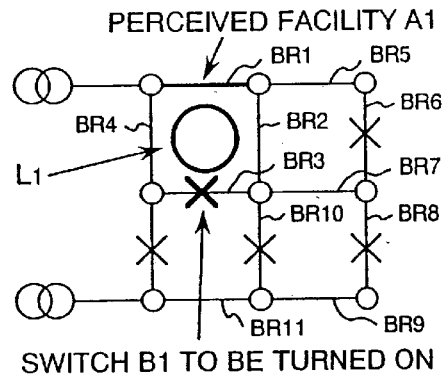
FIG. 5 is a drawing for explaining an example of neighbor candidate creation.
Figure 5B:
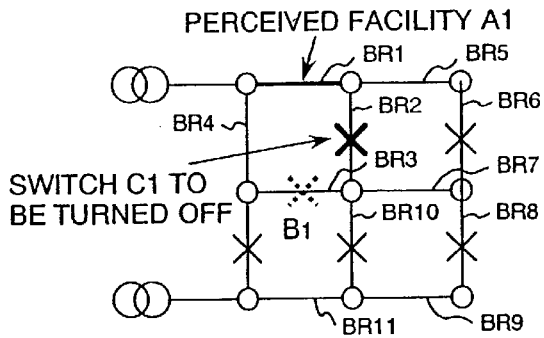
Figure 5C:
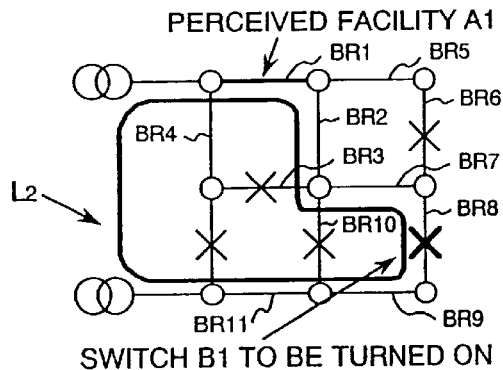
Figure 5D:
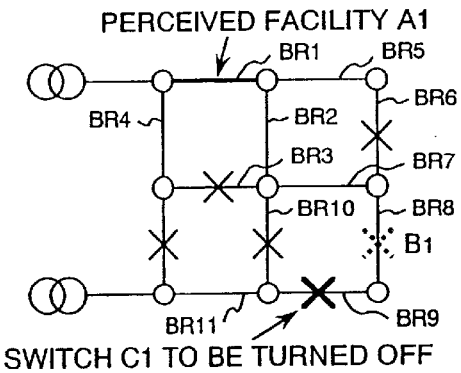
Figure 5E:
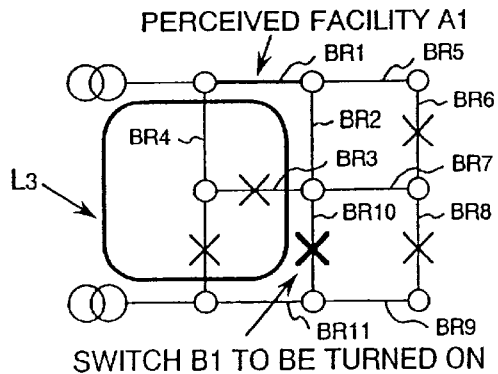
Figure 5F:
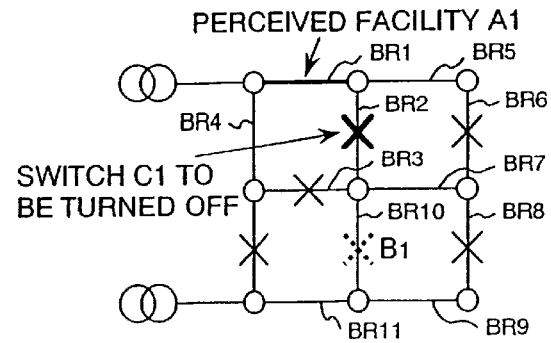
Figure 6A:
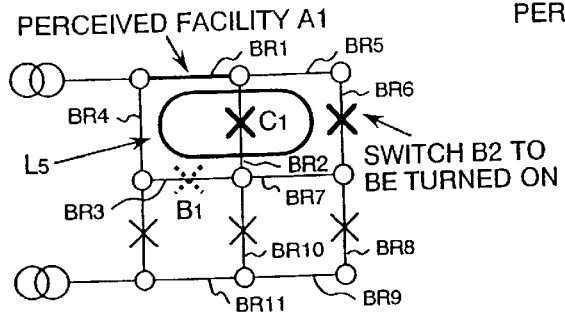
FIG. 6 is a drawing for explaining another example of neighbor candidate creation.
Figure 6B:
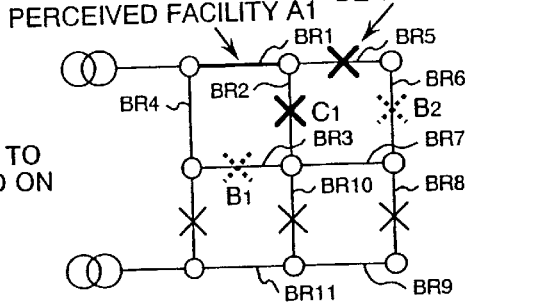
Figure 6C:
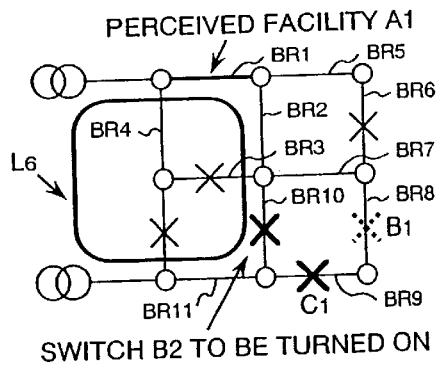
Figure 6D:
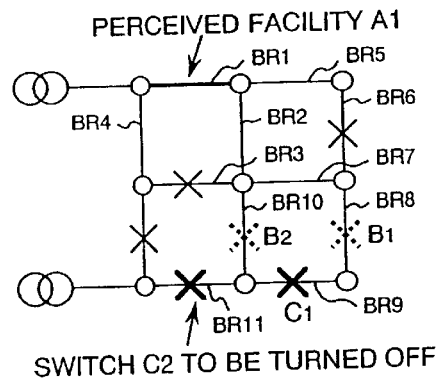
Figure 6E:
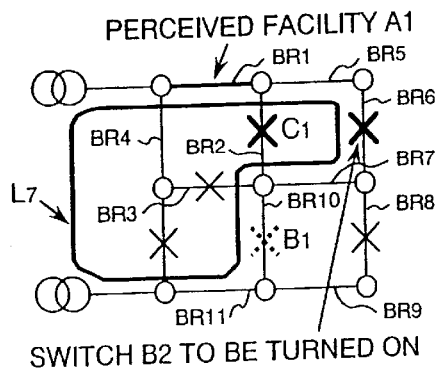
Figure 6F:
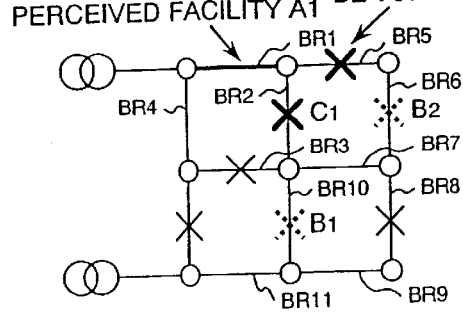
Figure 8:
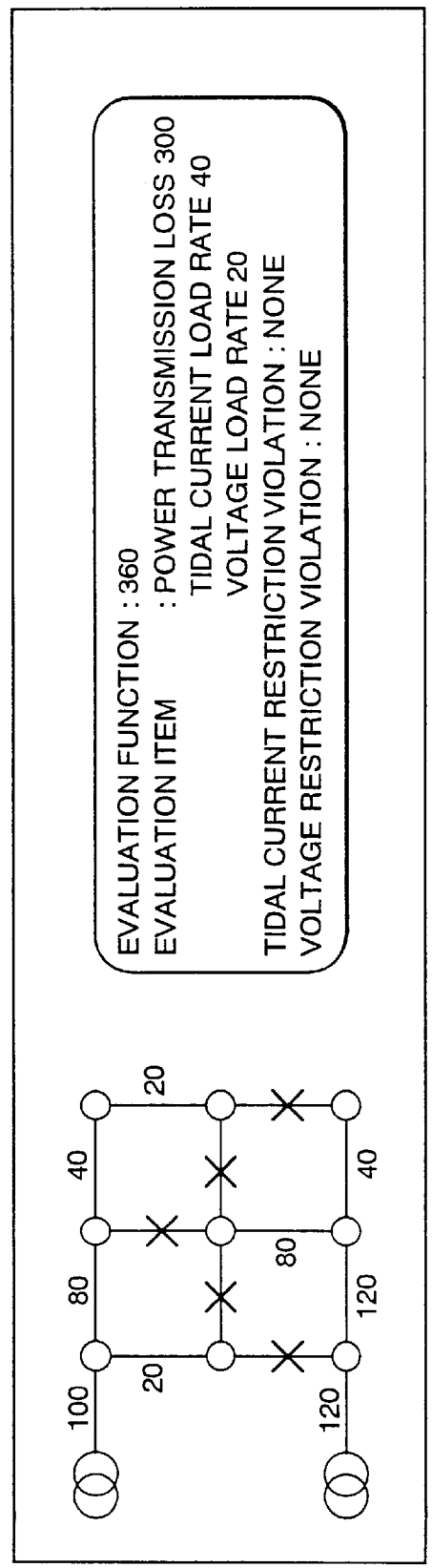
FIG. 8 shows an example of contents of a created optimum network configuration displayed on the display screen.

FIGS. 5a, 5c and 5e indicate the network configuration statuses at present or at a certain point of iteration respectively. As shown in the drawings, each branch drawn with a bold line is a perceived facility A1 and to create a loop including it, the switch B1 of one branch is turned on. As shown in FIGS. 5b, 5d and 5f, when the switch C1 of one branch constituting the created loop is turned off so as to open the loop, an neighbor candidate can be created. The neighbor candidates of the examples shown in FIGS. 5a, 5c and 5d are different from each other in the facility constituting the loop. For example, the loop created by turning one switch on in FIG. 5a is structured so as to include 4 branches BR1-BR4, so that there are 4 branches which can be turned off. In the same way, in the case of FIG. 5c, when the switches between the two transformers and between the transformers and the nodes are excluded from the components of the loop, there are 6 branches BR1, BR2, BR7, BR8, BR9 and BR11 constituting the loop, so that there are 6 branches which can be turned off In the case of FIG. 5c, there are 4 branches BR1, BR2, BR10 and BR11 constituting the loop and there are 4 branches which can be turned off Therefore, the number of neighbor candidates which can be created by changing the on or off status of a set of switches for the current network configuration shown in FIG. 5a is 14(=4+6+4).

On the other hand, FIG. 6 shows an example of an neighbor candidate which can be created by turning the switch on or off twice for the current network configuration. Namely, it is an example of creating a new neighbor candidate as shown in FIGS. 6b, 6d and 6f by repeating the second creation and opening of a loop including the perceived facility A1 which is different from the one shown in FIG. 5a on the basis of the statuses of network configuration shown in FIGS. 5b, 5d and 5f which are obtained by one loop creation and opening operation. Namely, when the neighbor candidate is assumed as a system which can be created by one loop creation and opening, to transit to the status shown in FIG. 6b by two continuous searches by the Tabu Search method, it is necessary that the evaluation function in the status shown in FIG. 5b among the neighbor candidates obtained by the first operation is optimum. However, when the neighbor candidate is assumed to be created by two loop creation and opening operations, even if the evaluation function shown in FIG. 5b is not optimum, it is possible to transit to the candidate shown in FIG. 6b by one search operation.

The examples shown in FIG. 6 create the loop networks including the perceived facility A1 by both the first and second operations. Furthermore, the loop created in FIG. 6c is a loop which can be created also in FIG. 5e. However, the statuses of other switches are different, so that transition from FIG. 5e to FIG. 6d is impossible by one loop creation and opening creation. Therefore, even if the neighbor candidate obtained by the first operation is not optimum, when an neighbor candidate is to be created by two unit operations, transition is made possible. Namely, the facility B1 relating to the first loop opening is assumed as a temporary perceived facility and the network configuration including the temporary perceived facility B1 and not including the original perceived facility which can be created by a new loop creation and opening operation becomes an neighbor candidate. When it is intended to create an neighbor candidate so that the loop to be created always includes the perceived facility A1 like this, the power flow value of the perceived facility can be changed. Therefore, such an operation method is valid in creation of a network configuration aiming at cancellation of power flow restriction violation and minimization of transmission power loss mainly. Even when the count of loop creation and opening operations is larger than 2, an neighbor candidate also can be created.

FIG. 7 shows an example of a method for creating an neighbor candidate by changing the on and off status of 2 sets of switches. Namely, there is a method for creating one loop by turning on the two switches B1 and B2 shown in FIG. 7a and turning off the switches B1 and B2 or the switches C1 and C2 of the branch constituting the loop which can be created by turning the switches B1 and B2 on. In FIG. 7a, by turning the switch B1 or the switches B1 and B2 on, a loop can be created and by turning the switches C1 and C2 off, the neighbor candidate shown in FIG. 7b is created. The same may be said with a case that an neighbor candidate is created by turning 3 or more sets of switches on or off.

Furthermore, network configurations obtained by changing of the status of the aforementioned one set of switches and changing of the status of two sets of switches can be defined as neighbor candidates respectively. Furthermore, an neighbor candidate can be defined by combining them. As the number of combinations of status changes of switches reduces, neighbor candidates to be evaluated reduce in number, so that the time required for search can be shortened. As the number of switches to be changed increases, even if the solution space is not continuous, that is, even in the unmovable state by operation of a set of switches because the restriction condition is not satisfied, a plurality of solution spaces can be searched and a wide range can be searched.

When neighbor candidates are to be created by the creation and opening operation of 2 sets of loop networks, if a set of loop networks creates an neighbor candidate so as to include the perceived facility A1 and the other set of loop creates an neighbor candidate so as not to include the perceived facility A1, although the power flow value of the perceived facility is small, the connection status of the facilities to which the transformer supplies power changes, so that it is valid in cancellation of voltage violation. For cancellation of voltage violation, an neighbor candidate obtained by creating a loop so as to always include the perceived facility also can be included.

In accordance with the object of creating a network configuration as mentioned above, in the definition of an neighbor candidate when a plurality of loop networks are to be created, one of "including the perceived facility always" and "no need to include the perceived facility" is selected on the screen 17 shown in FIG. 4.

As mentioned above, selection of a perceived facility and setting of creation conditions of an neighbor candidate by loop creation and opening have been explained. However, even when the loop creation and opening operation is performed three times or more, an neighbor candidate can be created in the same way. The case that a branch is set as a perceived facility has been explained. However, even when a node is set as a perceived facility, that is, by the creation and opening operation of a loop including the perceived node, an neighbor candidate can be created in the same way.

Next, using the screen 17 shown in FIG. 4, the count j of loop creation and opening for creating an neighbor candidate and the rate aj of each count are set. The sum total of rates aj is 100%. For example, assuming the sum total when the loop creation and opening operation is performed once as 100%, the number of neighbor candidates, that is, the number of evaluation objects can be reduced. For example, assuming the sum total when the loop creation and opening operation is performed once as a% and the sum total when the operation is performed two times as (100−a)%, when the loop creation and opening operation is performed once, the solution space is split into a plurality of spaces. Namely, even when there is another solution space which is impossible to reach without experiencing the restriction violation status, a solution space different from the current solution space can be searched. When the number of loop creation and opening operations is increased, the number of neighbor candidates to be created increases in proportion to the power of the number of facilities for creating loop networks, so that it is desirable to reduce the rate of large counts in practical use.

Next, using the screen 17 shown in FIG. 4, the length of taboo list of the Tabu Search method which is an optimization method is set. The taboo list stores movement (change) information accompanying search transition. For example, the taboo list stores the name Son of a switch which changes from OFF to ON by transition by one search or the name Soff of a switch which changes from ON to OFF. When an neighbor candidate is to be created by one loop creation and opening operation, there are a method for setting one of the name and information of a switch to be added to the taboo list as a unit and a method for setting a set of them as a unit available. In the former case, it is tabooed to create an neighbor candidate changing the status of the switch Son or Soff according to the taboo list. In the latter case, it is tabooed to create an neighbor candidate changing the statuses of a set of the switches Son or Soff at the same time. Incidentally, since the length of the taboo list is finite, the name of a switch which is tabooed by one search (transition) is stored in the taboo list and the name of the oldest tabooed switch is deleted at the same time. Namely, the structure of the taboo list is a constitution of FIFO (first-in first-out).

Next, according to the screen 17 shown in FIG. 4, the rate of valid length of the taboo list is set. The valid length of the taboo list is used to make the rate of the number of candidates to be searched among the neighbor candidates constant. When this rate is 100%, all data of the taboo list is valid. When the rate is less than 100%, valid neighbor candidates among p neighbor candidates are limited to q each. The valid taboo list length is changed every search so as to make the rate of q/p close to the set rate. When the list length is fixed, all the neighbor candidates are tabooed to move by the taboo list and the search may be stopped. However, it can be avoided. When movement to all the neighbor candidates is tabooed by the taboo list, the search can be continued by clearing the list. As a clearing method for continuing the search, it is available to clear the whole list or to repeat clearing of only the list of the last portion.

The neighbor candidate can be selected according to the creation object of a power network configuration. For example, there is a case that power transmission loss minimization, voltage violation cancellation, or power flow restriction violation cancellation is an object. Furthermore, the power flow restriction value of the facility designated on the screen 17 shown in FIG. 4 can be changed temporarily. Namely, by setting the power flow restriction value of a facility to as a small value as possible in consideration of a failure, it is possible to make the power failure amount or the power failure range smaller when a failure occurs in the objective facility or to make the power flow restriction values of a plurality of selected feeders (branches directly connected to the transformer) equal to each other and balance the load of each feeder. When balancing the load, the power flow restriction value is set to the maximum value and the minimum value. In the same way, the voltage target value of the designated facility can be changed temporarily. The set system creation conditions are stored in the data base 4. When the setting ends, the screen returns to the initial menu screen 16.

Next, the evaluation function setting method will be explained. The item 3 is selected on the initial menu screen 16 shown in FIG. 3 so as to set an evaluation function. The evaluation function is used to evaluate the system status and it may be a function which can be calculated uniquely when the network configuration is decided. In this example, a new evaluation function is set by editing an evaluation function which is already registered or by newly creating and it is stored in the data base 4 together with the registration number and comments. When evaluating a switched system, it is desirable to designate the registration number of the evaluation function to be used. The evaluation function can be set freely. As an actual evaluation function, an example of transmission loss power, power flow restriction violation rate, and voltage restriction violation rate will be explained hereunder.

When the transmission loss is assumed as an evaluation function Zloss, it is calculated on the basis of load flow calculation. Assuming the voltage to be fixed, the transmission loss is calculated from the impedance of the transmission line and the current of the objective transmission line using the following formula.

$$Zloss = \Sigma\{I_1 ij \times I_1 ij + a \times I1ij \times I1ij + b \times Iij \times Iij\} \times rij \qquad (1)$$

where the range which the facilities i and j can take is a set when the facilities i and j are connected with a transmission line or others and I1ij: passing current through the transmission line between the facilities i and j, Iij: load connected to the transmission line between the facilities i and j, rij: impedance between the facilities i and j, a: coefficient (when the load is distributed on average, it is set to, for example, 1), and b: coefficient (when the load is distributed on average, it is set to, for example, ⅓).

There is a method for calculating the transmission loss from the passing current of the switch also available. There is no need to always calculate the transmission loss for all the objective systems and the transmission loss can be evaluated from the relative value between the neighbor systems.

As a power flow restriction, the following can be considered. For example, when it is an object to control the power flow flowing through the transmission line less than the restriction value, the system becomes better as the evaluation function reduces in size. The evaluation function Zpf uses the weighting factor of each facility which is set by the evaluation function setting screen and the evaluation function f. When the power flow is perceived, Formula (2) is obtained.

$$Zpf = \Sigma \ wj \times fj \ (Fj/Rj) \qquad (2)$$

where j: facility number, wj: weighting factor of the facility j,

Fj: power flow value of the facility j,

Rj: power flow restriction value of the facility j, and fj (Fj/Rj): evaluation function of allowance and violation of restriction conditions.

When the weighting factor of an important facility is increased, the important facility can constitute an allowable system and enhance the reliance. By changing the weighting factor and the evaluation function f like this, the required network configuration can be tuned. Namely, when the evaluation function f is made linear like Formula (3), a highly allowable system on average is selected and when Fj/Rj is made larger than 1 like Formula (4), that is, it is made much larger when a restriction violation occurs, it is possible to reduce the number of facilities of restriction violation and allow facilities with a small weighting factor to make a restriction violation easily.

$$fj(Fj/Rj) = Fj/Rj \quad (3)$$

$$\begin{aligned} fj(Fj/Rj) &= Fj/Rj \text{ and } Fj/Rj < a1 \\ &= k1 \text{ and } a1 \leq Fj/Rj < a2 \\ &= k2 \text{ and } a2 \leq Fj/Rj \end{aligned} \quad (4)$$

where a1: numerical value less than 1, for example, 0.95 when an allowance of 5% is given, a2: numerical value less than 1, for example, 0.99 when an allowance of 1% is given, k1: numerical value larger than 1, for example, 2, and k2: numerical value sufficiently larger than k1, for example, 5.

The following can be considered as a voltage drop restriction. For example, when it is an object to control the voltage lowering of the transmission line, as the evaluation function reduces in size, a better system can be obtained. The evaluation function Zvol uses the weighting factor of each facility which is set by the evaluation function setting screen and the evaluation function g. When the voltage is perceived, Formula (5) is obtained.

$$Zvolk = \Sigma \, wk \times gk(Vk/Vk1) \quad (5)$$

where k: facility number, wk: weighting factor of the facility k,

Vk: voltage drop of the facility k,

Vk1: lower limit of voltage drop of the facility k, and gk(Vk/Vk1): evaluation function of allowance and violation of restriction conditions. The voltage drop can be calculated as the sum of products of the current Ij of the facility j installed between the transformer and the transmission line k which is supplied to the transmission line k and the impedance rj of the facility like Formula (6).

$$Vk = \Sigma Ijk \times rjk \quad (6)$$

When the weighting factor of an important facility is increased, the important facility can constitute an allowable system and enhance the reliance. By changing the weighting factor and the evaluation function g like this, the required network configuration can be tuned. Namely, when the evaluation function g is made linear like Formula (7), a highly allowable system on average is selected and when Vk/Vk1 is made larger than 1 like Formula (8), that is, it is made much larger when a restriction violation occurs, it is possible to reduce the number of facilities of restriction violation and allow facilities with a small weighting factor to make a restriction violation easily.

$$gk(Vk/Vk1) = Vk/Vk1 \quad (7)$$

$$\begin{aligned} gk(Vk/Vk1) &= Vk/Vk1 \text{ and } Vk/Vk1 < a3 \\ &= k3 \text{ and } a3 \leq Vk/Vk1 < a4 \\ &= k4 \text{ if } a4 \leq Vk/Vk1 \end{aligned} \quad (8)$$

where a3: numerical value less than 1, for example, 0.95 when an allowance of 5% is given, a4: numerical value less than 1, for example, 0.99 when an allowance of 1% is given, k3: numerical value larger than 1, for example, 2, and k4: numerical value sufficiently larger than k1, for example, 5.

Furthermore, as evaluation items, the difference between the power flow restriction value and the power flow value, the number of facilities of power flow restriction violation, the difference between the lower limit of voltage and the voltage, and the number of facilities of voltage restriction violation can be considered. When the failure power due to a failure is perceived, they can be added to the evaluation function. When the load-carrying capacity of power and the load are changed with time, how many hours can be held as a system free of power flow restriction violation and voltage restriction violation in the created network configuration or the sum of transmission losses during the continued time can be set as an evaluation function. By doing this, not only optimization of the created network configuration only during a single time but also optimization during the continuous time in consideration of an evaluation function within the continuous time can be realized.

By multiplying the evaluation items expressed by Formulas (1), (2), and (5) and the difference between the power flow restriction value and the power flow value, the number of facilities of power flow restriction violation, the difference between the lower limit of voltage and the voltage, and the number of facilities of voltage restriction violation by the weighting factor, the system status can be evaluated by a new evaluation function.

The example that power distribution system data, system creation conditions, and an evaluation function are set by the network configuration creation apparatus 2 has been explained above. However, they can be set by the power distribution system 5 instead of it. When the setting of those conditions ends, the screen returns to the initial menu screen 16.

Next, a procedure for creating an optimum network configuration will be explained on the basis of the conditions set above. Firstly, the item 4 on the initial menu screen 16 of the display unit 3 is selected by the input device 1 and the process of creating an optimum network configuration starts. A rough processing flow for creating an optimum network configuration is shown in FIG. 1. This process is realized by each processing unit of the network configuration creation apparatus shown in FIG. 2.

Step 21

When a start instruction is given, the data reading unit 9 executes the data reading process. Namely, the data reading unit 9 decides data to be used by the registration number from the power distribution system data, system creation conditions, and evaluation function which are set by the data setting unit 8 and stored in the data base 4 and fetches necessary data.

Step 22

The perceived facility selection unit 10 decides the perceived facility K. The perceived facility K is decided according to the object set under the system creation conditions. The objects are, for example, the power transmission loss maximum facility, power transmission loss rate maximum facility, voltage violation facility (the order of violation facilities is decided by importance and others), voltage violation maximum facility, voltage violation rate maximum facility, power flow restriction violation, power flow restriction violation maximum facility, power flow restriction violation rate maximum facility, important facility order, and open facility order (the important facility order of open facilities, etc.). When the perceived facility is decided in the order of the power transmission loss maximum facility, power transmission loss rate maximum facility, voltage violation maximum facility, voltage violation rate maximum facility, power flow restriction violation maximum facility, and power flow restriction violation rate maximum facility, the objective facility can be decided by the power flow calculation result in the current state. However, even if the same facility is used continuously as a perceived facility, the evaluation function improves little. Therefore, when a facility is selected once, it will not be selected as a perceived facility for a fixed search count. Furthermore, in setting of power distribution system data, the important facility order or the open facility order (the important facility order of open facilities, etc.) can be used as an order of perceived facilities. When the perceived facility is a switch in the on state, switches which are turned on in the initial state are put in order and the order of the switch a which is changed from off to on by searching hereafter takes over the order of the switch b which is turned on so as to create a loop including the switch a. By doing this, the order for setting an OFF switch as a perceived facility can be decided uniquely. When reducing the power transmission loss, restriction cancellation is not an object. Therefore, it is desirable to create a loop including the perceived facility as far as possible so as to create an neighbor status and change the system. However, when cancellation of voltage restriction violation or power flow restriction violation is an object and no violation is generated in the perceived facility, the search for the facility can be skipped. To obtain a better status defined by the evaluation function, it is possible to create and transit to an neighbor status even if there is no restriction violation.

Step 23

As explained in FIGS. 5 to 7, a new candidate Kj in the neighbor network configuration status is created by the network configuration candidate creation unit 13. An neighbor candidate is created by the definition of the neighbor status set under the system creation conditions. Namely, neighbor candidates are created sequentially according to the count of loop creation and opening operations and the rate thereof. When the count of loop creation and opening operations is one time and the rate thereof is 100%, a system which can be created by creating a loop including the perceived facility once and opening the loop becomes an neighbor candidate. When the rate is less than 100%, the count of loop creation and opening operations is decided first from a random number. For example, when the first time is 60% and the second time is 40% and the random number (0 to 1.0) is 0.6 or less, one time is selected as a count of loop creation and opening operations and when the random number is larger than 0.6, twice is selected. When twice is selected as a count of loop creation and opening operations, by creating a loop including the perceived facility and then opening it, a radial network configuration is created halfway. Furthermore, by creating and opening a loop including a constituent facility when a loop including the perceived facility is created, an neighbor candidate is created.

When a valid taboo list length is set under the system creation conditions, all neighbor candidates are created once and the number of candidates Pn which are tabooed by the first n-th list of the taboo list is obtained. Next, when it is assumed that the neighbor candidate is p and the valid rate set under the system creation conditions is q/p, the number of neighbor candidates to be tabooed is decided. Namely, n when the deviation between the sum of Pk from k=1 to K=n and (p−q) is small is obtained. n when the deviation is minimum, or n when the deviation is not negative but minimum, or n when the deviation is not positive but minimum is used. It is necessary to keep the number of neighbor candidates away from 0. The n is the valid list length in the current system. Since the number of neighbor candidates varies with the current status and the taboo list also varies with searching, the valid list length n changes every searching.

Steps 24 to 28

At Step 24, whether the neighbor candidate Kj is tabooed or not is decided. When the neighbor candidate Kj is tabooed, the program goes to Step 28 so that the neighbor candidate Kj is not selected as an optimum system among the neighbor candidates and sets a sufficiently large value in the evaluation function. On the other hand, when the neighbor candidate Kj is not tabooed, the program goes to Step 25 and calculates the evaluation function Zkj in the network configuration evaluation unit 11. In this case, an evaluation item which can be calculated by power flow calculation when status of neighbor candidate is decided is used. The applicable evaluation function is a one which is set on the evaluation function setting screen. On the basis of the obtained evaluation function, at Step 26, whether the evaluation is optimum or not among the neighbor candidates K1 to Kj−1 which are created until now is decided. When the decision shows that the evaluation function is optimum among the neighbor candidates in the current status, the program goes to Step 27 and stores it as an optimum neighbor candidate to be transited to next. An item necessary to reproduce the system status is stored. Whether the evaluation function value, changing status (so as to be used in the taboo list), and restriction conditions are satisfied or not is also stored.

Step 29

After Steps 24 to 28 are processed, whether there is the next candidate or not is decided. When there is the next candidate, the program returns to Step 23 and repeats the processes of Steps 23 to 29. On the other hand, when there is no next neighbor candidate, the program goes to Step 30.

Step 30

In this case, the new current system is set as a network configuration aiming at an optimum neighbor candidate among the neighbor candidates by the optimum network configuration candidate selection and storage unit 14 and the evaluation function transits (updates) to this network configuration. In this case, the changing status stored at Step 27 is added to the taboo list. The oldest taboo list is deleted at the same time.

Step 31

After updating the taboo list, the optimum network configuration candidate selection and storage unit 14 judges whether the evaluation function for the current updated network configuration is best or not for the optimum network configuration transited up to now.

Step 32

When the evaluation function for the updated system candidate is best as a result of the judgment at Step 31, the program stores the optimum network configuration as a current updated network configuration and goes to Step 33.

Step 33

Next, the program judges whether there is the next perceived facility or not. When there is the next perceived facility, the program returns to Step 22 and when there is not the next perceived facility, the program goes to Step 34.

Step 34

The optimum network configuration among the network configurations searched through the aforementioned steps, that is, the network configuration stored at Step 32 is outputted to the display unit 3. In this case, the item to be displayed and the display method are decided by the display data creation unit 15. The item to be displayed on the display unit 3 can include the value of each item among the connection status of a facility constituting the optimum network configuration shown in FIG. 8, load flow calculation result, evaluation function value, and evaluation function. In addition to it, to indicate the searching situation, the evaluation function shown in FIG. 9 and changes of each item (the evaluation function is the sum of evaluation items) of the evaluation function can be displayed. It is desirable that the power transmission loss, power flow value, and voltage of each facility can be displayed by information from the input device 1.

In the aforementioned embodiment, an example of creation of a power distribution network configuration is explained. However, it can be applied also to a high order power system such as a power transmission system on a high voltage level.

As mentioned above, according to the present invention, there is an effect that by changing the perceived facility sequentially, using the Tabu Search method, and repeating the transition to the network configuration which is an optimum evaluation function among the created neighbor status, for example, a network configuration for intending power transmission loss minimization, cancellation of power flow restriction violation, and cancellation of voltage restriction violation, that is, an optimum network configuration can be created in a short time and the profitability and reliability of the power distribution system can be improved.

What is claimed is:

1. A method of creating a radial network configuration for a power system having a plurality of switches comprising:
   creating loop networks by setting at least two of said plurality of switches in an on state;
   creating radial network configuration candidates by setting at least two of said plurality of switches in an off state except for the switches set in the on state;
   evaluating the created network configuration candidates; and
   deciding a network configuration on the basis of the evaluation.

2. A method of creating a radial network configuration for a power system having a plurality of switches according to claim 1, wherein said loop network is created by setting two of said plurality of switches in the on state, and said radial network configuration candidate is created by setting two of said plurality of switches in the off state except for the switches set in the on state.

3. A method of creating a radial network configuration for a power system having a plurality of switches comprising:
   a) creating a first loop network by closing a first switch which is turned off in said switches;
   b) opening said first loop network by opening a second switch which is turned on in said switches in said first loop;
   c) creating a second loop network by closing a third switch which is turned off in said switches; and
   d) creating a radial network configuration candidate by opening a fourth switch which is turned on in said switches in said second loop network.

4. A method of creating a radial network configuration for a power system having a plurality of switches according to claim 3, wherein opening said switch creates a radial network configuration candidate.

5. A method of creating a radial network configuration for a power system having a plurality of switches according to claim 3, wherein steps a) through d) are repeated to obtain different radial network configuration candidates.

6. A method of creating a radial network configuration for a power system having a plurality of switches according to claim 3, wherein steps a) through b) are repeated to obtain different radial network configuration candidates.

* * * * *